(12) United States Patent
Tamm et al.

(10) Patent No.: US 11,098,744 B2
(45) Date of Patent: Aug. 24, 2021

(54) TORQUE LIMITING FASTENER

(71) Applicant: Classic Connectors, Inc., Clinton, OH (US)

(72) Inventors: Carl Russel Tamm, Trussville, AL (US); Randy L. Wolf, Trussville, AL (US)

(73) Assignee: Classic Connectors, Inc., Clinton, OH (US)

( * ) Notice: Subject to any disclaimer, the term of this patent is extended or adjusted under 35 U.S.C. 154(b) by 252 days.

(21) Appl. No.: 16/205,287

(22) Filed: Nov. 30, 2018

(65) Prior Publication Data
US 2020/0173483 A1 Jun. 4, 2020

(51) Int. Cl.
*F16B 31/02* (2006.01)
*F16B 37/04* (2006.01)

(52) U.S. Cl.
CPC .......... *F16B 31/021* (2013.01); *F16B 37/044* (2013.01)

(58) Field of Classification Search
CPC .... F16B 31/021; F16B 37/044; F16B 37/122; F16B 1/0071; F16B 39/021; F16B 37/046; F16B 37/045
USPC .................................................. 411/108, 965
See application file for complete search history.

(56) References Cited

U.S. PATENT DOCUMENTS

| | | | | | |
|---|---|---|---|---|---|
| 2,336,791 | A | * | 12/1943 | La Barre Dwight | F16B 37/061 411/259 |
| 3,444,775 | A | * | 5/1969 | Hills | F16B 31/021 411/5 |
| 3,742,583 | A | * | 7/1973 | Devlin | F16B 31/021 29/413 |
| 3,765,464 | A | * | 10/1973 | Hasegawa | F16B 37/044 411/108 |
| 3,785,421 | A | * | 1/1974 | Launay | F16B 37/044 411/108 |
| 3,805,863 | A | * | 4/1974 | Starr | F16B 41/002 411/335 |
| 4,037,515 | A | * | 7/1977 | Kesselman | F16B 41/005 411/3 |

(Continued)

FOREIGN PATENT DOCUMENTS

| | | | |
|---|---|---|---|
| CN | 205937416 U | 2/2017 | |
| EP | 0634811 A1 * | 1/1995 | ............... H01R 4/30 |

(Continued)

*Primary Examiner* — Victor D Batson
*Assistant Examiner* — Amit Singh Dhillon
(74) *Attorney, Agent, or Firm* — The Watson IP Group, PLC; Jovan N. Jovanovic (57) ABSTRACT

A torque limiting fastener comprises a body. The body defines a first body portion and a second body portion that extend from a first end of the body to a second end of the body. The body comprises an inner surface extending from the first end of the body to the second end of the body. The body further comprises an outer surface extending from the first end of the body to the second end of the body. The body yet further comprises an inner threadform extending substantially along a length of the inner surface of the second body portion and a controlled break region. The controlled break region is disposed at an intersection of the first body portion and the second body portion. The controlled break region includes an outer surface break point formed into the outer surface and an inner surface break point formed into the inner surface.

18 Claims, 8 Drawing Sheets

(56) References Cited

U.S. PATENT DOCUMENTS

| | | | | |
|---|---|---|---|---|
| 4,408,936 | A * | 10/1983 | Williamson | F16B 19/05 411/281 |
| 5,375,955 | A * | 12/1994 | Leslie | F16B 1/0071 411/378 |
| 5,784,738 | A * | 7/1998 | Updike | E01D 15/124 14/2.4 |
| 6,073,552 | A * | 6/2000 | Cruse | F16B 1/0071 101/32 |
| 6,176,659 | B1 * | 1/2001 | Hardt | F16B 31/021 411/393 |
| 6,769,850 | B2 * | 8/2004 | Lay | F16B 5/02 411/108 |
| 7,780,377 | B2 * | 8/2010 | Brady | E21D 21/0093 405/259.1 |
| 9,010,218 | B2 * | 4/2015 | Peterson | B44B 5/022 76/107.1 |
| 10,626,908 | B2 * | 4/2020 | Morden | B64D 45/02 |
| 2002/0102148 | A1 * | 8/2002 | Shibata | F16B 15/00 411/439 |
| 2003/0021652 | A1 * | 1/2003 | Uno | F16B 37/04 411/338 |
| 2003/0198528 | A1 * | 10/2003 | Onishi | F16B 31/021 411/2 |
| 2004/0067120 | A1 * | 4/2004 | Speer | F16B 1/0071 411/14 |
| 2007/0297869 | A1 * | 12/2007 | Kunda | F16B 5/025 411/108 |
| 2008/0014042 | A1 * | 1/2008 | De France | F16B 33/00 411/2 |
| 2008/0238084 | A1 * | 10/2008 | Hung | G09F 3/00 283/81 |
| 2009/0123220 | A1 * | 5/2009 | Chou | F16B 37/044 403/21 |
| 2009/0245967 | A1 * | 10/2009 | Curley, Jr. | F16B 37/044 411/112 |
| 2012/0174765 | A1 * | 7/2012 | Kunda | F16B 37/044 89/36.08 |
| 2015/0291225 | A1 * | 10/2015 | Yao | F16B 1/00 296/203.01 |
| 2016/0305464 | A1 * | 10/2016 | Balderrama | F16B 31/021 |
| 2017/0288319 | A1 * | 10/2017 | Vanzetto | F16B 31/021 |
| 2019/0162222 | A1 * | 5/2019 | Vovan | B23P 19/062 |

FOREIGN PATENT DOCUMENTS

| | | | |
|---|---|---|---|
| RU | 2230950 C1 | 6/2004 | |
| WO | 1998046892 A1 | 10/1998 | |
| WO | WO-2011007052 A1 * | 1/2011 | F16B 39/286 |

* cited by examiner

TORQUE LIMITING FASTENER

CROSS-REFERENCE TO RELATED APPLICATION

N/A

BACKGROUND OF THE DISCLOSURE

1. Field of the Disclosure

The disclosure relates in general to fasteners, and more particularly, to a torque limiting fastener which is configured to controllably break forming a shear plane, while allowing for tool access after shearing.

2. Background Art

The use of torque limiting fasteners is known in the art. In particular, such fasteners typically include a threadform. When the inner threadform is engaged and the fastener is tightened, eventually, the torque required to further tighten the fastener exceeds the strength of the fastener, and the fastener controllably breaks to preclude further tightening. Thus, it is known, at the point of breaking, that the torque of the fastener matches the strength of the fastener.

While such fasteners are known in the art, there are problems associated with such prior art fasteners. For example, it is often difficult to accurately set the torque at which the fastener breaks. It is further difficult to manipulate the fastener after the fastener controllably breaks. It is further difficult to provide for accurate and predetermined breakage formations on the fastener after breaking.

SUMMARY OF THE DISCLOSURE

The disclosure is directed to a torque limiting fastener comprising a body. The body defines a first body portion and a second body portion. The first body portion and the second body portion extend from a first end of the body to a second end of the body. The body comprises an inner surface extending from the first end of the body to the second end of the body. The body further comprises an outer surface extending from the first end of the body to the second end of the body. The body yet further comprises an inner threadform extending substantially along a length of the inner surface of the second body portion and a controlled break region. The controlled break region is disposed at an intersection of the first body portion and the second body portion. The controlled break region includes an outer surface break point formed into the outer surface and an inner surface break point formed into the inner surface. The outer surface break point and the inner surface break point define a shear plane therebetween.

In some configurations, a torque rating is displayed on the outer surface of the second body portion.

In some configurations, the torque rating is at least one of stamped into the outer surface of the second body portion and painted onto the outer surface of the second body portion.

In some configurations, the second body portion is comprised of a nut disposed within the second body portion and in contact with the inner surface of the second body portion.

In some configurations, the nut is removable from the second body portion.

In some configurations, the nut is a hex nut.

In some configurations, the nut is formed from one of aluminum, steel, copper, an alloy, and plastic.

In some configurations, the first body portion includes a stop ridge extending substantially around a circumference of the first body portion, the stop ridge being proximate to the controller break region.

In some configurations, the outer surface of the first body portion is comprised of a hexagonal shape.

In some configurations, the outer surface of the second body portion includes a hexagonal shape.

In some configurations, the inner surface of the first body portion is substantially a constant diameter from the first end to the controlled break region.

In some configurations, an outer tapered region along the outer surface of the second body portion, the outer tapered region being proximate to the controlled break region, with a narrowest portion of the outer tapered region being proximate to the controlled break region and the outer tapered region widening as the distance from the controlled break region increases.

In some configurations, the inner threadform has a substantially uniform diameter between a starting thread and an ending thread.

In some configurations, the body is formed from one of aluminum, steel, copper, aluminum alloy, stainless steel, brass, and plastic.

In some configurations, the inner threadform extends from a starting thread disposed proximate the first end and an ending thread disposed proximate the second end.

In some configurations, an inner tapered region is disposed along the inner surface proximate the controlled break region, with a narrowest portion of the inner tapered region being proximate to the controlled break region, the inner tapered region widening as the distance from the controlled break region increases.

In some configurations, the breaking of the torque limiting fastener along the shear plane does not distort an inner surface break point along the inner surface proximate to the shear plane.

In some configurations, the shear plane is one of a substantially flat shear plane, a conical shear plane, and an inverted conical shear plane.

In some configurations, the outer surface is a first outer surface, the torque limiting fastener further comprises a nut retainer disposed between a second outer surface of a nut within the second body portion and the inner surface of the second body portion. In some configurations, the torque limiting fastener further comprises an outer tapered portion that tapers toward a nut disposed within the second portion and an inner tapered portion that tapers toward the nut disposed within the second portion.

BRIEF DESCRIPTION OF THE DRAWINGS

The disclosure will now be described with reference to the drawings wherein.

DETAILED DESCRIPTION OF THE DISCLOSURE

While this disclosure is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the disclosure, and some of the components may have been distorted from actual scale for purposes of pictorial clarity.

Figure 1:
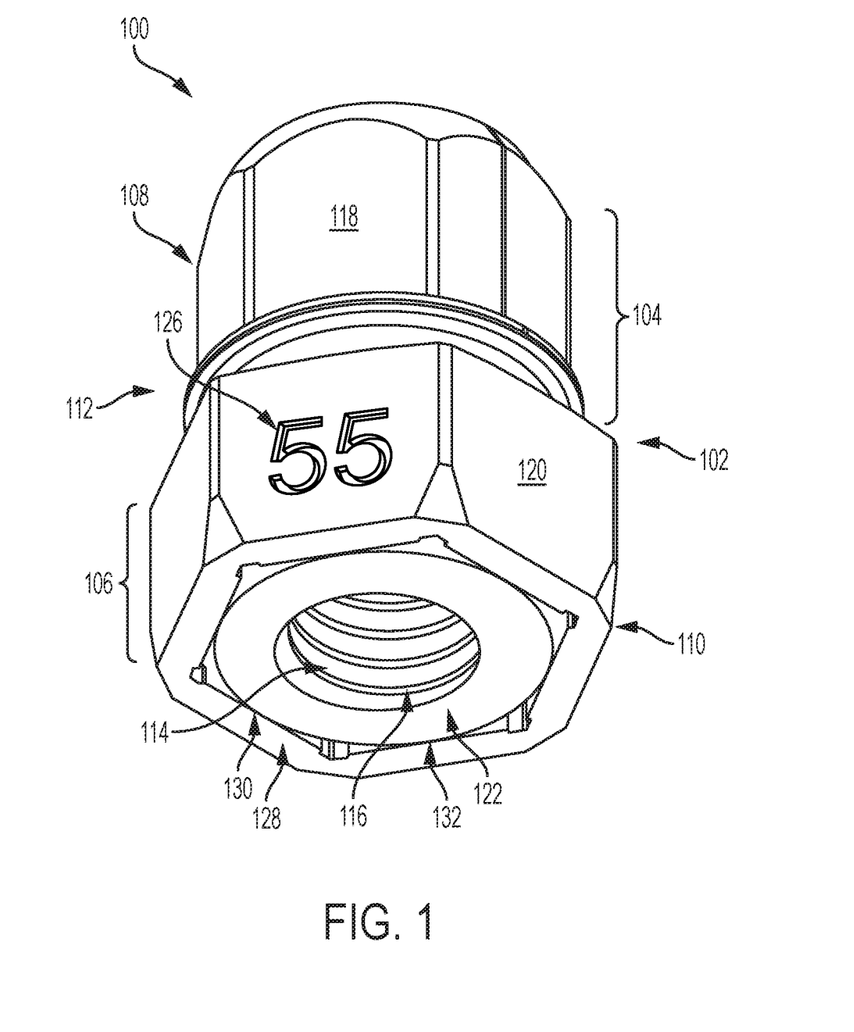
FIG. 1 of the drawings is a perspective view of an example torque limiting fastener, in accordance with the embodiments disclosed herein.

Referring now to the drawings and in particular to FIG. 1, the torque limiting fastener is shown generally as 100. The torque limiting fastener 100 can be formed from a metal, such as aluminum, steel, copper, or any other metal that can be used as a fastener, an alloy, such as aluminum alloy, stainless steel, brass, or any other alloy that can be used as a fastener, a plastic, such as Polyethylene terephthalate, Polyethylene, Polyvinyl Chloride, or any other plastic that can be used as a fastener, or any other material that can be used as a fastener.

The torque limiting fastener 100 is defined by a body 102 which is comprised of a first body portion 104 and a second body portion 106, the first body portion 104 and the second body portion 106 together extending from a first end 108 of the body 102 to a second end 110 of the body 102. The body 102 includes an inner surface 202 (FIG. 2) and an outer surface 112. In some embodiments, the inner surface 202 of the first body portion 104 is at least substantially smooth, although in other embodiments the inner surface 202 can be textured. The inner surface 202 extends from the first end 108 of the body 102 to the second end 110 of the body 102. Likewise, the outer surface 112 extends from the first end 108 of the body 102 to the second end 110 of the body 102. The first body portion 104 generally comprises an elongated configuration having a generally hexagonal outer and circular inner cross-sectional configuration. This hexagonal configuration is configured to be retained by a tool.

In an example, the outer surface 112 of the first body portion 104 is comprised of a plurality of faces 118 that together form a hexagonal shape. This hexagonal shape provides compatibility with either metric or Society of Automotive Engineers (SAE) tools, such as sockets or wrenches. In an example, the outer surface 112 of the second body portion 106 includes a plurality of faces 120 forming a hexagonal shape. This hexagonal shape provides compatibility with either metric or Society of Automotive Engineers (SAE) tools, such as sockets or wrenches. In some embodiments, the hexagonal shape of the first body portion 104 and the hexagonal shape of the second body portion 106 have a same width such that a same size tool may be used for both the first body portion 104 and the second body portion 106. In other embodiments, the hexagonal shape of the first body portion 104 and the hexagonal shape of the second body portion 106 have different widths such that different size tools may be used for the first body portion 104 and the second body portion 106.

The body 102 further includes an inner threadform 114 that extends substantially along a length of the inner surface 202 of the second body portion 106. The body 102 yet further includes a controlled break region 206 (FIG. 2) disposed at an intersection of the first body portion 104 and the second body portion 106. The controlled break region 206 including an outer surface break point 208 formed into the outer surface 112 and an inner surface break point 210 formed into the inner surface 202, the outer surface break point 208 and the inner surface break point 210 defining a shear plane 212 therebetween. The shear plane 212 is the shortest distance between the inner surface break point 210 and the outer surface break point 208. The torque rating for breaking apart the first body portion 104 from the second body portion 106 is based on the material selection for the body 102 and the thickness of the body 102 between the inner surface break point 210 and the outer surface break point 208.

Figure 4A:
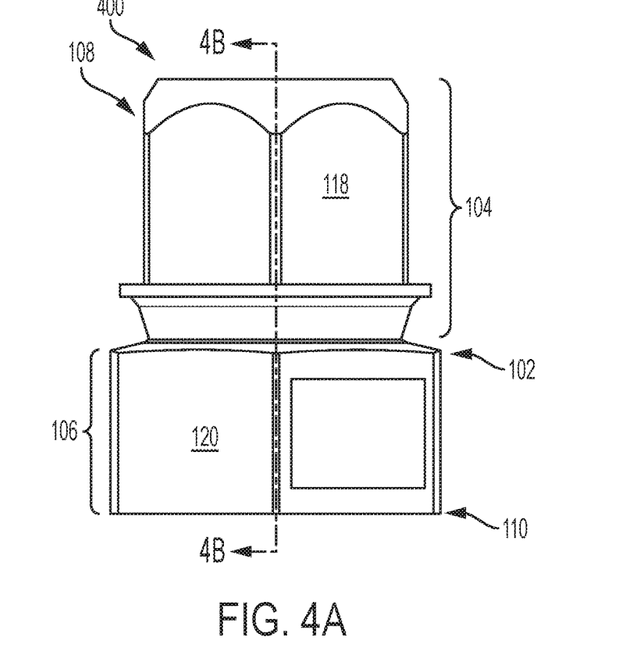
FIGS. 4A and 4B of the drawings is a side view and a cross-sectional view of yet another example torque limiting fastener, respectively, in accordance with the embodiments disclosed herein.
Figure 4B:
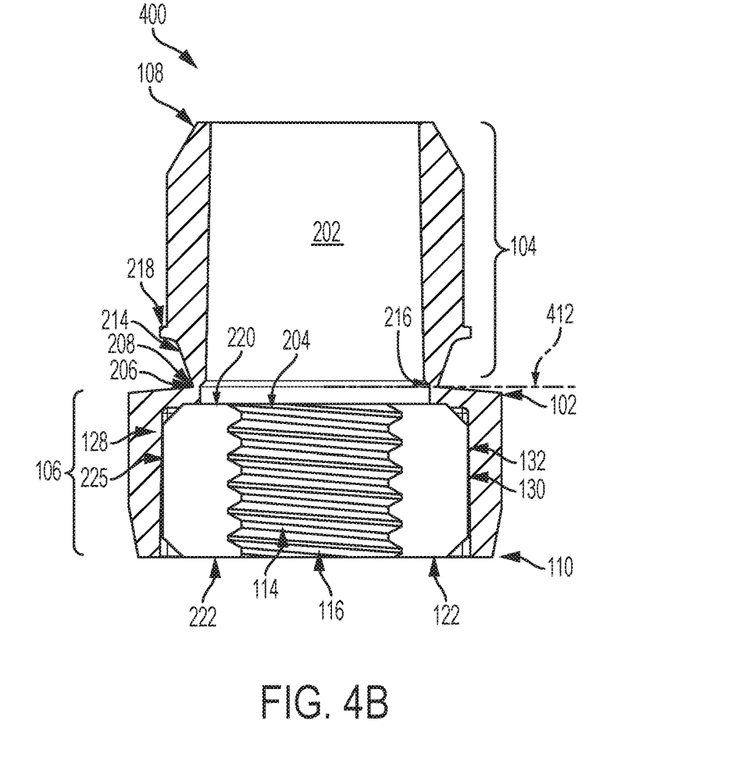
Figure 5A:
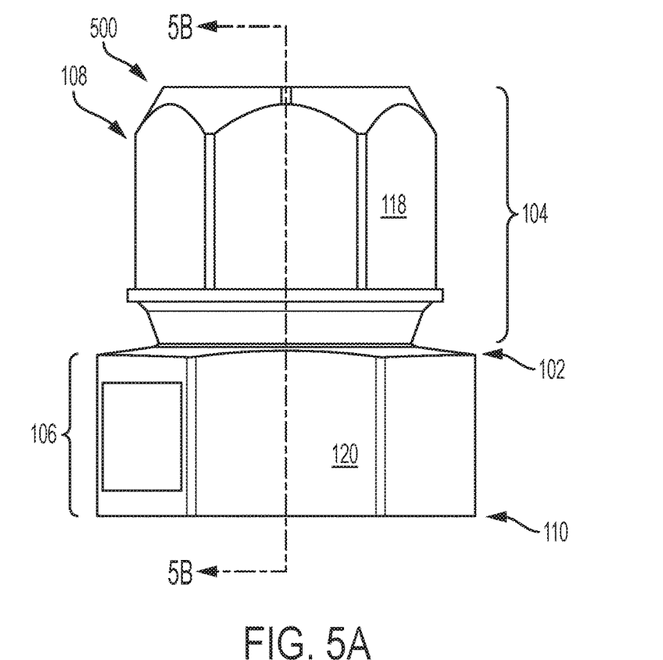
FIGS. 5A and 5B of the drawings is a side view and a cross-sectional view of yet another example torque limiting fastener, respectively, in accordance with the embodiments disclosed herein.
Figure 5B:
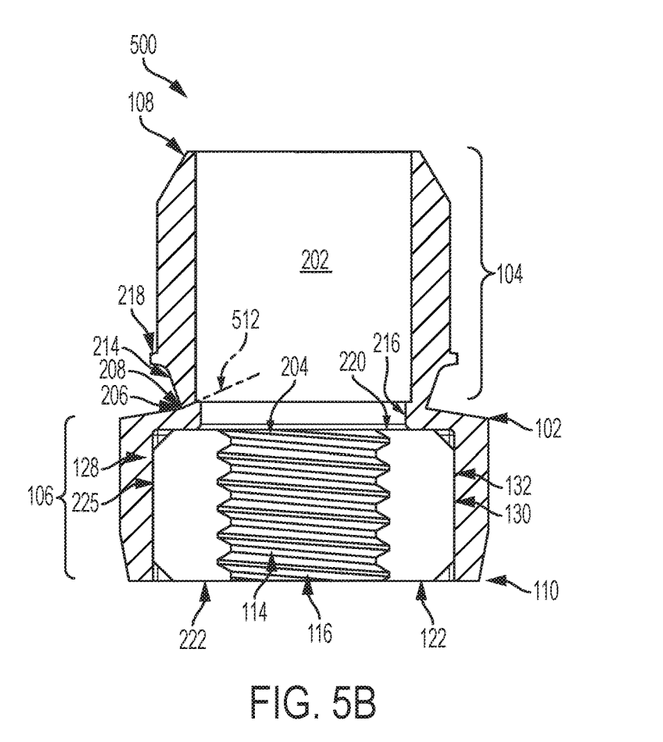

The shear plane 212 of the example torque limiting fastener 100 forms a conical shear plane or funnel-shape shear plane. However, other geometries are possible. For example, the inner surface break point 210 can be formed substantially in a horizontal plane with the outer surface break point 208, thereby forming a flat shear plane 412 (FIGS. 4A and 4B). For example, the inner surface break point 210 can be formed higher than the outer surface break point 208, resulting in the inner surface break point 210 being located above the shear plane and thereby forming a frusto-conical shear plane or an inverted funnel/inverted conical shear plane 512 (FIGS. 5A and 5B). The size, location, and angle of the shear plane 212 can be varied to achieve a desired torque characteristic for the torque limiting fastener 100. In an embodiment, a machining that forms the torque limiting fastener 100 can be varied or a location along the vertical axis of a core pin (not shown) which forms nut 122 can be changed. In another embodiment, a diameter of the core pin can be changed. Any of these changes effectively alter the cross section that is the shear plane 212. For example, such a core pin change can produce a flat shear plane 412 (FIGS. 4A and 4B) and a frusto-conical shear plane or the inverted funnel/inverted conical shear plane 512 (FIGS. 5A and 5B).

In some embodiments, the inner threadform 114 extends from a starting thread 116 disposed proximate to the second end 110 and an ending thread 204 (FIG. 2) disposed proximate to the shear plane 212. It will be understood that the inner threadform 114 may be continuous between the starting thread 116 and the ending thread 204, and substantially uniform. In other configurations, variations are contemplated as well as spacing or breaks in the threads for various purposes. In the configuration illustrated, the inner threadform 114 stops short of the first end 124. In some embodiments, the inner threadform 114 has a substantially uniform diameter between the starting thread 116 and the ending thread 204. In some embodiments, the inner threadform 114 extends from the starting thread 116 disposed proximate the first end 108 and the ending thread 204 disposed proximate the second end 110.

Figure 2:
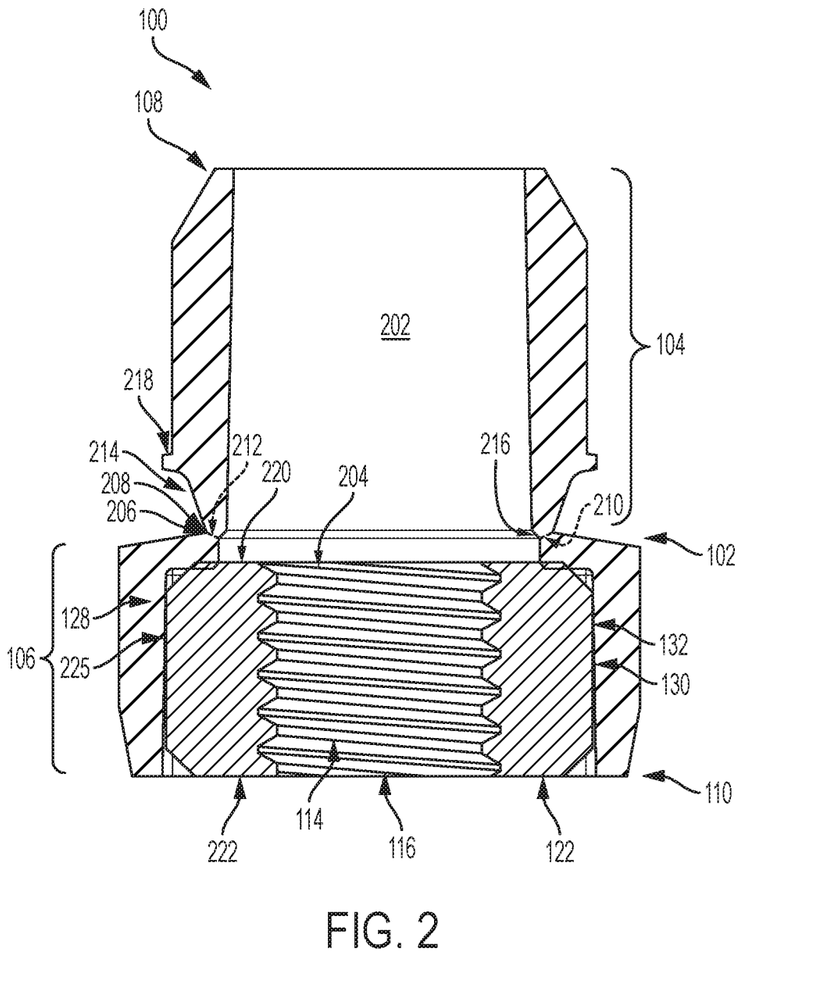
FIG. 2 of the drawings is a cross-sectional view of the example torque limiting fastener, in accordance with the embodiments disclosed herein.

In an example, the inner surface 202 of the first body portion 104 is substantially a constant diameter from the first end 108 to the controlled break region 206. The body 102 extends from first end 108 to second end 110, and generally comprises an elongated configuration having a generally hexagonal outer and circular inner cross-sectional configuration along the inner threadform 114. Generally, the length of the torque limiting fastener 100 exceeds the diameter of the body 102, although variations are contemplated. In some configurations, an inner tapered region 216 is disposed along the inner surface 202 proximate the controlled break region 206, the inner tapered region 216 being disposed proximate to the shear plane 212. A narrowest portion of the inner tapered region 216 is proximate to the controlled break region 206, with the inner tapered region 216 widening as the distance from the controlled break region 206 increases. In some embodiments, breaking of the torque limiting fastener 100 along the shear plane 212 does not distort the inner surface break point 210 along the inner surface 202 proximate to the shear plane 212.

In some embodiments, an outer tapered region 214 (FIG. 2) is disposed along the outer surface 112 of the first body portion 104. The outer tapered region 214 is proximate to the controlled break region 206. A narrowest portion of the outer tapered region 214 is proximate to the controlled break region 206, with the outer tapered region 214 widening as the distance from the controlled break region 206 increases.

In some embodiments, a torque rating 126 may be displayed on the outer surface 112 of the second body portion 106. In the example shown, the torque rating is "55". This torque rating 126 may be at least one of stamped into the outer surface 112 of the second body portion 106 and painted onto the outer surface 112 of the second body portion 106. The torque rating 126 can display at least one of a metric torque rating and an SAE torque rating.

In some configurations, the second body portion 106 is comprised of a nut 122 and a shell 128, with the nut 122 being disposed within the shell 128 and in contact with the inner surface 202 of the shell 128. The outer surface 130 of the nut 122 and the inside surface 132 of the shell 128 have approximately same dimensions. The nut 122 includes a first end 124 and a second end 220 (FIG. 2). In examples, the nut 122 is either hexagonal or square, although the nut 122 can be other shapes as required for a particular application. The nut 122 can be a castle nut, an acorn nut, a jam nut, a nylock nut, a jam nylock nut, a K nut, a flanged nut, or any other type of nut. The nut 122 can be formed from a metal, such as aluminum, steel, copper, or any other metal that can be used as a fastener, an alloy, such as aluminum alloy, stainless steel, brass, or any other alloy that can be used as a fastener, a plastic, such as Polyethylene terephthalate, Polyethylene, Polyvinyl Chloride, or any other plastic that can be used as a fastener, or any other material that can be used as a nut. The torque limiting fastener 100, excluding the nut 122, is shown as comprising a monolithic component formed with, e.g., a casting process. In other embodiments, the torque limiting fastener 100 is formed by a machining process, although other forming processes are contemplated for use. In some configurations, additional features or separate components may be coupled to the body 102, at the first end 108, the second end 110, or at any point(s) therebetween.

During operation of the torque limiting fastener 100, the torque limiting fastener 100 is torqued to screw the torque limiting fastener 100 onto a threaded post (not shown), such as a bolt. When the torque limiting fastener 100 makes contact against the second end 110 and the torque is continued, the first body portion 104 separates from the second body portion 106 along the shear plane 212, with the second body portion 106 remaining on the threaded post. Thereafter, the hexagonal shape of the second body portion 106 allows for easy removal of the nut 122 from the threaded post.

In some configurations, the nut 122 is removable from the second body portion 106. In other configurations, the nut 122 is permanently affixed to the second body portion 106. In some configurations, the nut 122 is comprised of the same material as the remainder of the body 102. In other configurations, the nut 122 is comprised of a different material as the remainder of the body 102.

In some configurations, the first body portion 104 includes a stop ridge 218 extending substantially around a circumference of the first body portion 104, the stop ridge 218 being proximate to the controlled break region 206. During operation, this stop ridge 218 provides a limiting point for a tool, such as a socket or wrench, from being disposed past the point of the stop ridge 218. In an example, the top of the stop ridge 218 is right angled and the bottom of the stop ridge 218 is chamfered. In other examples, the stop ridge 218 can be other shapes, such as the bottom surface of the stop ridge 218 being also right angled.

In an embodiment, the torque limiting fastener 100 further includes a nut retainer 225. In an example, the nut retainer 225 is disposed between the outer surface 130 of the nut 122 and the inner surface 202 of the shell 128, although other locations are possible. The nut retainer 225 can be an adhesive (such as a silicone-based adhesive), a weld, casting the nut 122 in place, or any other type of retainer that retains the nut 122 within the shell 128. In the case of casting the nut 122 in place, the nut 122 can be a threaded insert with the outer surface 130 of the nut 122 being textured to which a cast metal (or plastic) of the shell 128 engages to provide retention.

Figure 3:
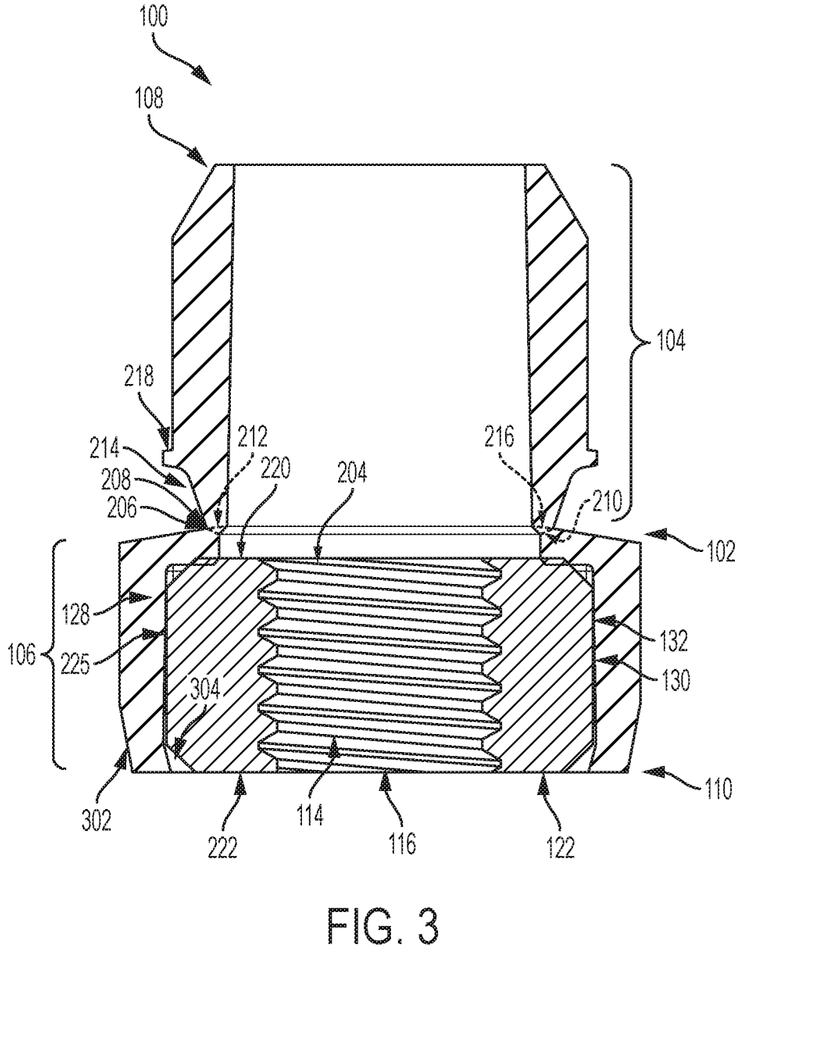
FIG. 3 of the drawings is a cross-sectional view of another example torque limiting fastener, in accordance with the embodiments disclosed herein.

FIG. 3 of the drawings is a cross-sectional view of another example torque limiting fastener 300. The torque limiting fastener 300 is similar to the torque limiting fastener 100, but further includes an outer tapering portion 302 proximate to the second end 110. The outer tapered portion 302 tapers toward the nut 122 within the second portion 106, at the second end 110. On the opposite side of the outer tapered portion 302, the torque limiting fastener 300 further includes an inner tapered portion 304. The inner tapered portion 304 also tapers toward the nut 122 within the second portion 106, at the second end 110. The outer tapered portion 302 and the inner tapered portion 304 thereby form a "C" shaped configuration for the second body portion 106 that bends around the outer surface 130 of the nut 122. This "C" shaped configuration for the second body portion 106 prevents the nut 122 from being able to slide out of the second end 110 of the second body portion 106.

FIGS. 4A and 4B of the drawings is a side view and a cross-sectional view of yet another example torque limiting fastener 400. The cross-sectional view of FIG. 4B is viewed from section line 4B-4B shown in FIG. 4A. In contrast to the reverse conical shear plane or inverted funnel-shape shear plane of shear plane 212, the torque limiting fastener 400 includes the flat shear plane 412, forming a substantially horizontal shear plane (+/−5 degrees off horizontal). The flat shear plane 412 is substantially parallel with the first end 108 and the second end 110 of the torque limiting fastener 400.

FIGS. 5A and 5B of the drawings is a side view and a cross-sectional view of yet another example torque limiting fastener 500. The cross-sectional view of FIG. 5B is viewed from section line 5B-5B shown in FIG. 5A. In contrast to the reverse conical shear plane or inverted funnel-shape shear plane of shear plane 212, the torque limiting fastener 500 includes the frusto-conical shear plane or the inverted funnel/inverted conical shear plane 512.

Figure 6:
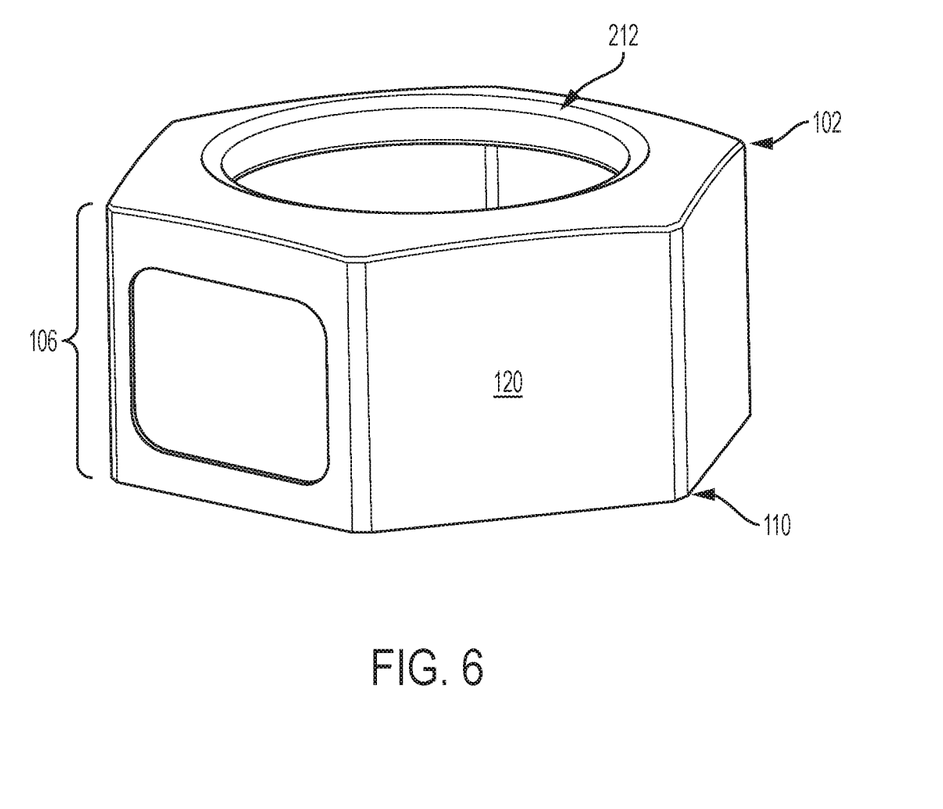
FIG. 6 illustrates an isometric view of the second portion of the torque limiting fastener after separation from the first portion of the torque limiting fastener shown in FIG. 1, in accordance with the embodiments disclosed herein.
Figure 7:
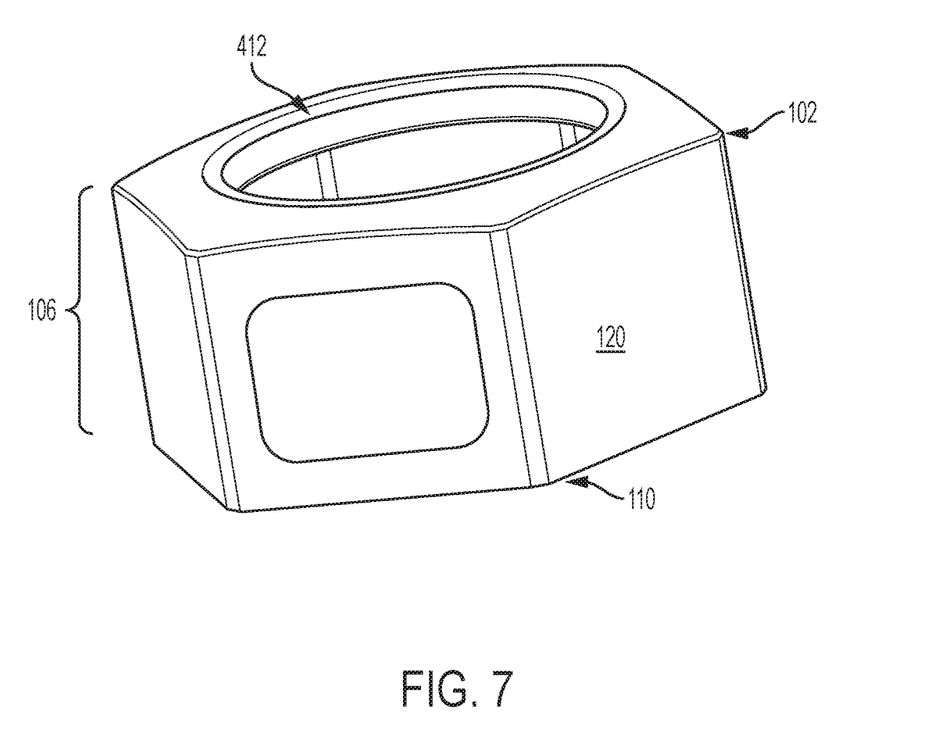
FIG. 7 illustrates an isometric view of the second portion of the torque limiting fastener after separation from the first portion of the torque limiting fastener shown in FIGS. 4A and 4B, in accordance with the embodiments disclosed herein.
Figure 8:
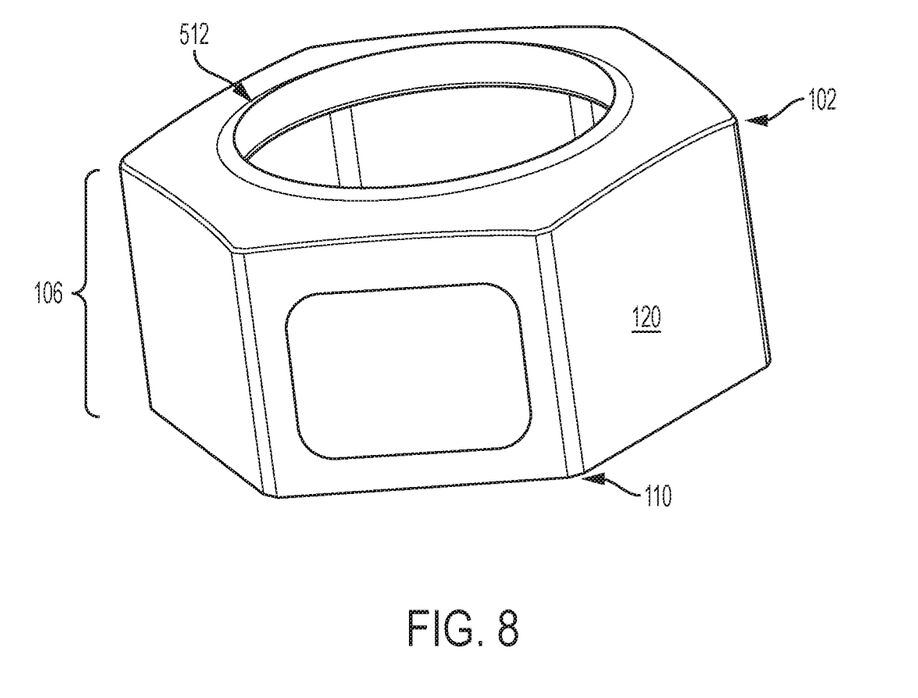
FIG. 8 illustrates an isometric view of the second portion of the torque limiting fastener after separation from the first portion of the torque limiting fastener shown in FIGS. 5A and 5B, in accordance with the embodiments disclosed herein.

FIG. 6 illustrates an isometric view of the second portion 106 of the torque limiting fastener 100 after separation from the first portion 104 of the torque limiting fastener 100 shown in FIG. 1. In particular, FIG. 6 illustrates the reverse conical shear plane or inverted funnel-shape shear plane 212. FIG. 7 illustrates an isometric view of the second portion 106 of the torque limiting fastener 400 after separation from the first portion 104 of the torque limiting fastener 400 shown in FIGS. 4A and 4B. In particular, FIG. 7 illustrates the flat shear plane 412. FIG. 8 illustrates an isometric view of the second portion 106 of the torque limiting fastener 500 after separation from the first portion 104 of the torque limiting fastener 500 shown in FIGS. 5A and 5B. In particular, FIG. 8 illustrates the frusto-conical shear plane or the inverted funnel/inverted conical shear plane 512.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A torque limiting fastener comprising:
a body defining a first body portion and a second body portion, the first body portion and the second body portion extending from a first end of the body to a second end of the body, the body comprising:
an inner surface extending from the first end of the body to the second end of the body;
an outer surface extending from the first end of the body to the second end of the body;
an inner threadform extending substantially along a length of the inner surface of the second body portion; and
a controlled break region disposed at an intersection of the first body portion and the second body portion;
wherein the first body portion shears off from the second body portion at a predetermined torque at an outer surface break point of annular definition formed into the outer surface and an inner surface break point of annular definition formed into the inner surface, the controlled break region defined by the outer surface break point and the inner surface break point being at different heights thereby forming an angled conical shear plane therebetween;
wherein the second body portion is comprised of a nut disposed within the second body portion and in contact with the inner surface of the second body portion.

2. The torque limiting fastener of claim 1, further comprising a torque rating displayed on the outer surface of the second body portion.

3. The torque limiting fastener of claim 2, wherein the torque rating is at least one of stamped into the outer surface of the second body portion and painted onto the outer surface of the second body portion.

4. The torque limiting fastener of claim 1, wherein the nut is removeable from the second body portion.

5. The torque limiting fastener of claim 1, wherein the nut is a hex nut.

6. The torque limiting fastener of claim 1, wherein the nut is formed from one of aluminum, steel, copper, aluminum alloy, stainless steel, brass, and plastic.

7. The torque limiting fastener of claim 1, wherein the first body portion includes a stop ridge extending substantially around a circumference of the first body portion, the stop ridge being proximate to the controlled break region.

8. The torque limiting fastener of claim 1, wherein the outer surface of the first body portion is comprised of a hexagonal shape.

9. The torque limiting fastener of claim 1, wherein the outer surface of the second body portion includes a hexagonal shape.

10. The torque limiting fastener of claim 1, wherein the inner surface of the first body portion is substantially a constant diameter from the first end to the controlled break region.

11. The torque limiting fastener of claim 1, further comprising an outer tapered region along the outer surface of the first body portion, the outer tapered region being proximate to the controlled break region, with a narrowest portion of the outer tapered region being proximate to the controlled break region and the outer tapered region widening as the distance from the controlled break region increases.

12. The torque limiting fastener of claim 1 wherein the inner threadform has a substantially uniform diameter between a starting thread and an ending thread.

13. The torque limiting fastener of claim 1 wherein the body is formed from one of aluminum, steel, copper, an alloy, and plastic.

14. The torque limiting fastener of claim 1 wherein the inner threadform extends from a starting thread disposed proximate the first end and an ending thread disposed proximate the second end.

15. The torque limiting fastener of claim 1 further comprising an inner tapered region disposed along the inner surface proximate the controlled break region, with a narrowest portion of the inner tapered region being proximate to the controlled break region, the inner tapered region widening as the distance from the controlled break region increases.

16. The torque limiting fastener of claim 1 wherein the angled conical shear plane is an inverted angled conical shear plane.

17. The torque limiting fastener of claim 1 wherein the outer surface is a first outer surface, the torque limiting fastener further comprising a nut retainer disposed between a second outer surface of a nut within the second body portion and the inner surface of the second body portion.

18. The torque limiting fastener of claim 1 further comprising an outer tapered portion that tapers toward a nut disposed within the second portion and an inner tapered portion that tapers toward the nut disposed within the second portion.

* * * * *